United States Patent [19]

Saito

[11] Patent Number: 5,511,091
[45] Date of Patent: Apr. 23, 1996

[54] CLOCK SYNCHRONIZATION CONTROL CHECK SYSTEM

[75] Inventor: Naritoshi Saito, Tokyo, Japan

[73] Assignee: Kabushiki Kaisha Toshiba, Japan

[21] Appl. No.: 258,817

[22] Filed: Jun. 13, 1994

[30] Foreign Application Priority Data

Jun. 14, 1993 [JP] Japan ................................. 5-142114

[51] Int. Cl.⁶ ............................. H04B 3/46; H04B 17/00
[52] U.S. Cl. ......................... 375/226; 375/371; 324/76.77
[58] Field of Search ............................. 375/10, 118, 60,
375/101, 224, 226, 228, 296, 348, 371;
324/527, 531, 620, 622, 76.77

[56] References Cited

U.S. PATENT DOCUMENTS

| | | | |
|---|---|---|---|
| 4,129,831 | 12/1978 | Fink et al. | 324/622 |
| 4,367,550 | 1/1983 | Douverne | 375/10 |
| 4,633,465 | 12/1986 | Fitch et al. | 375/10 |
| 4,757,519 | 7/1988 | Collison et al. | 375/60 |
| 4,953,181 | 8/1990 | Keiper, Jr. | 375/226 |
| 5,333,147 | 7/1994 | Nohara et al. | 375/10 |

OTHER PUBLICATIONS

Liu, C.-L., and Feher, K., "A New Filtering Strategy to Combat Delay Spread", in *Proceedings of the 1991 IEEE Vehicular Technology Conference*, Jul. 1991, pp. 776–781.

Primary Examiner—Stephen Chin
Assistant Examiner—Jeffrey W. Gluck
Attorney, Agent, or Firm—Banner & Allegretti, Ltd.

[57] ABSTRACT

A clock synchronization control check system for a digital baseband signal receiver which digitally provides a phase error to digital data generated by a digital modulator without the need for conversion of the digital data to analog data so that clock synchronization control in its demodulating section can be checked easily and precisely. In the system, a digital filter is used to suppress inter-symbol interference, and a set of filter coefficients for the digital filter is shifted along the time axis of an impulse response so as to provide a plurality of filter coefficient sets. By selecting one of the coefficient sets, a desired phase shift is given to the digital data signal.

8 Claims, 8 Drawing Sheets

FIG.5(a) BAUD RATE CLOCK

FIG.5(b) WAVEFORM A

FIG.5(c) WAVEFORM B

| MSB ADDRESS LSB | CENTER COEF. OF FILTER |
|---|---|
| 0 0 0 0 | c t |
| 0 0 0 1 | m 1 |
| 0 0 1 0 | m 2 |
| 0 0 1 1 | m 3 |
| 0 1 0 0 | m 4 |
| 0 1 0 1 | m 5 |
| 0 1 1 0 | m 6 |
| 0 1 1 1 | m 7 |
| 1 0 0 0 | p 8 |
| 1 0 0 1 | p 7 |
| 1 0 1 0 | p 6 |
| 1 0 1 1 | p 5 |
| 1 1 0 0 | p 4 |
| 1 1 0 1 | p 3 |
| 1 1 1 0 | p 2 |
| 1 1 1 1 | p 1 |

CLOCK SYNCHRONIZATION CONTROL CHECK SYSTEM

BACKGROUND OF THE INVENTION

1. Field of the Invention

The present invention relates to a system for checking the clock synchronization control in the demodulating section of a digital communication equipment.

2. Description of the Related Art

In a digital mobile communication equipment, control for proper clock synchronization between a transmitting signal and a received signal in its demodulating section is an important technological issue.

Whether a signal demodulating circuit properly performs clock synchronization control in accordance with a phase error generated in a received baseband signal so as to receive an error-free digital signal is an important check item in developing new signal demodulating circuits and an important test item in mass-producing such circuits.

In order to check for proper clock synchronization control in the demodulating section, it is necessary to conduct a test while changing the phase of the received signal. There was a test in which digital data modulated at a digital modulator is directly inputted to a demodulator. However, this test cannot check whether the clock synchronization control is properly performed in the demodulator because the phase of the received signal is not changed.

According to a conventional clock synchronization control check system, in the event that a phase error is generated, the clock synchronization is checked in such a manner that modulated digital data generated at the digital modulator is converted into an analog signal through a digital-to-analog (D/A) converter which in turn is converted into a digital signal through an analog-to-digital (A/D) converter while providing phase errors by changing the sampling clock of the A/D converter.

Referring to FIG. 9, which shows such conventional clock synchronization control check system, reference numeral 100 represents a part of a demodulation circuit to be checked, and reference numeral 200 represents the clock synchronization control check system. The elements 100 and 200 constitute a modem in a conventional baseband signal transmitter/receiver modem of a differential-phase-shift keying (DPSK) type in which section (a) is a modulating section and section (b) is a demodulating section.

In DPSK, the sign of a digital baseband signal corresponds to a phase shift between two consecutive symbols. In the modulating section (a), a digital input signal supplied from a data generator 120 is subjected to orthogonal separation at an in-phase component/orthogonal component (I/Q) separator 101, which in turn is subjected to modulation at a differential-phase-shift-keying modulator 102, and then subjected to filtering at root cosine roll-off (RCROF) filters 103-1 and 103-2 for the I and Q components to suppress inter-symbol interference so as to produce a modulated digital data. The modulated digital data is then converted into analog signals at D/A converters 109-1 and 109-2.

In the demodulating section (b), the analog signals are converted into digital signals at A/D converters 110-1 and 110-2, which are demodulated through RCROF filters 104-1 and 104-2, a demodulator 105, a detector 106, and an I/Q synthesizer 107. A received-clock reproduction circuit 108 extracts clock components from outputs of the demodulator 105 and reproduces a clock signal. The reproduced clock signal is supplied to the A/D converters 110-1 and 110-2 as a clock for the A/D converter.

In the clock synchronization control test, the phase of the clock is adjusted by delaying or advancing the clock signal through a phase delay circuit 111, and the error rate is measured by an error rate meter (not shown). Whether or not the clock phase is properly adjusted is judged based on the error rate.

As described above, in the conventional system, the clock synchronization control is checked on a hardware basis. Accordingly, when it is judged that clock synchronization control is not properly performed, it is difficult to locate a faulty part in the clock reproduction circuit. Further, the hardware must actually be constructed to change the clock phase, and it is difficult to provide any desired phase error to the clock on the hardware basis. Accordingly, the conventional system requires a great amount of time and cost for the clock synchronization control check.

SUMMARY OF THE INVENTION

Therefore, it is an object of the present invention to provide a clock synchronization control check system capable of providing any desired phase errors by directly inputting digital data generated by a modulating section into a demodulating section without converting the digital data into analog data and vice versa. Accordingly, the inventive clock synchronization control check system does not require D/A and A/D converters.

In one aspect of the present invention, the above object is attained by providing a clock synchronization control check system of a digital baseband signal receiver which comprises filtering means for suppressing inter-symbol interference, demodulating means for demodulating a signal, detecting means for detecting an output signal of the demodulating means, and means for detecting a phase shift in an eye pattern of the output of the demodulating means, wherein the filtering means comprises a digital filter and there is provided coefficient control means which selects one of a plurality of sets of filter coefficients so as to generate a desired phase shift.

According to the present invention, the coefficients of the RCROF filter provided for suppressing inter-symbol interference include a time factor which advances or delays a time in an impulse response. When a digital signal is passed through the filter whose coefficients include such a time factor, the digital signal can be provided with the phase shift as it is, i.e., without being converted into an analog signal which is then converted into a digital signal. As a result, the clock synchronization control check system does not require D/A and A/D converters. Further, by previously storing a plurality of different sets of coefficients of the RCROF filter in a memory, clock synchronization control check can be realized without using special hardware components and troublesome operations, since the coefficients can be easily read out from the memory on a software basis. Accordingly, the time and cost necessary for the design and check of the clock synchronization control can be saved to a large extent.

DESCRIPTION OF THE PREFERRED EMBODIMENTS

Figure 1:
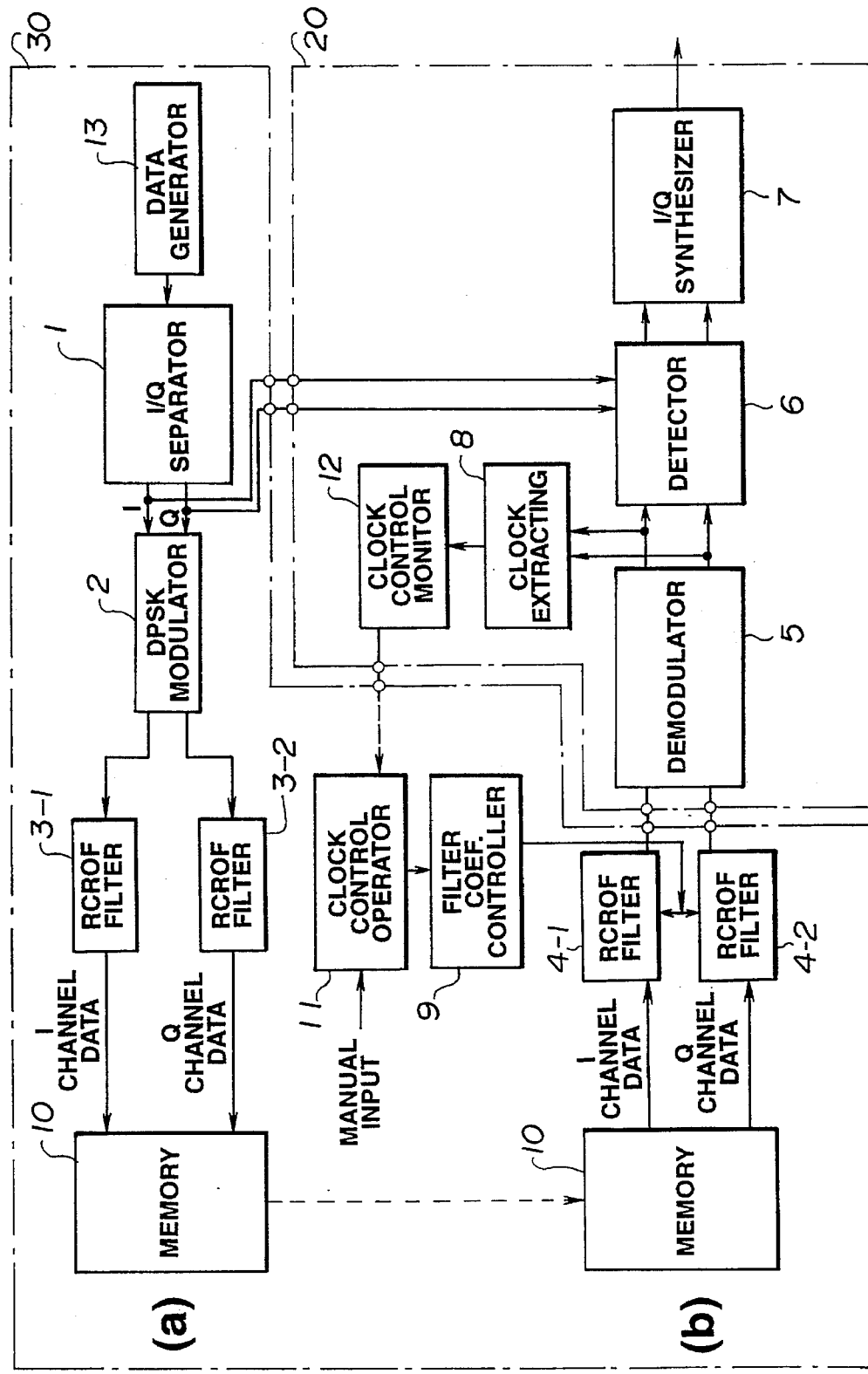
FIG. 1 is a block diagram of a modem of a baseband transmission/reception apparatus comprising a circuit to be checked and a clock synchronization control check system in accordance with an embodiment of the present invention.

Referring to FIG. 1, reference numeral 20 denotes a circuit to be checked which is a part of a demodulation circuit, and reference numeral 30 denotes a clock synchronization control check system. The construction of the circuit 20 to be checked and the clock synchronization control check system 30 is not limited to the demodulation circuit 20 to be checked, and the clock synchronization control check system 30 constitutes a modem for a differential-phase-shift keying type baseband signal transmitter/receiver. In FIG. 1, (a) is a modulating section and (b) is a demodulating section.

In the modulating section (a), reference numeral 1 denotes an I/Q separator for separating digital input data into an in-phase component I and an orthogonal component Q, 2 a differential-phase-shift-keying modulator, and 3-1 and 3-2 RCROF filters for suppressing inter-symbol interference. The I/Q separator 1, the differential-phase-shift-keying modulator 2, and the RCROF filters 3-1 and 3-2 constitute a modulator. The reference numeral 10 is a memory for storing modulated digital data prepared in the modulating section (a). In the demodulating section (b), reference numerals 4-1 and 4-2 denote RCROF filters for suppressing inter-symbol interference, 5 a demodulator for demodulating the modulated data, 6 a detector for determining whether the demodulated data is "1" or "0", 7 an I/Q synthesizer for synthesizing I channel data and Q channel data to reproduce the original data, 8 a clock extracting circuit for extracting a clock component from the received data, 9 a coefficient controller for the RCROF filters 4-1 and 4-2, 11 a clock control operator, and 12 a clock control monitor.

Description will now be made as to the coefficient controller 9 for controlling the coefficients of the RCROF filters 4-1 and 4-2 constituted by digital filters.

Figure 2:
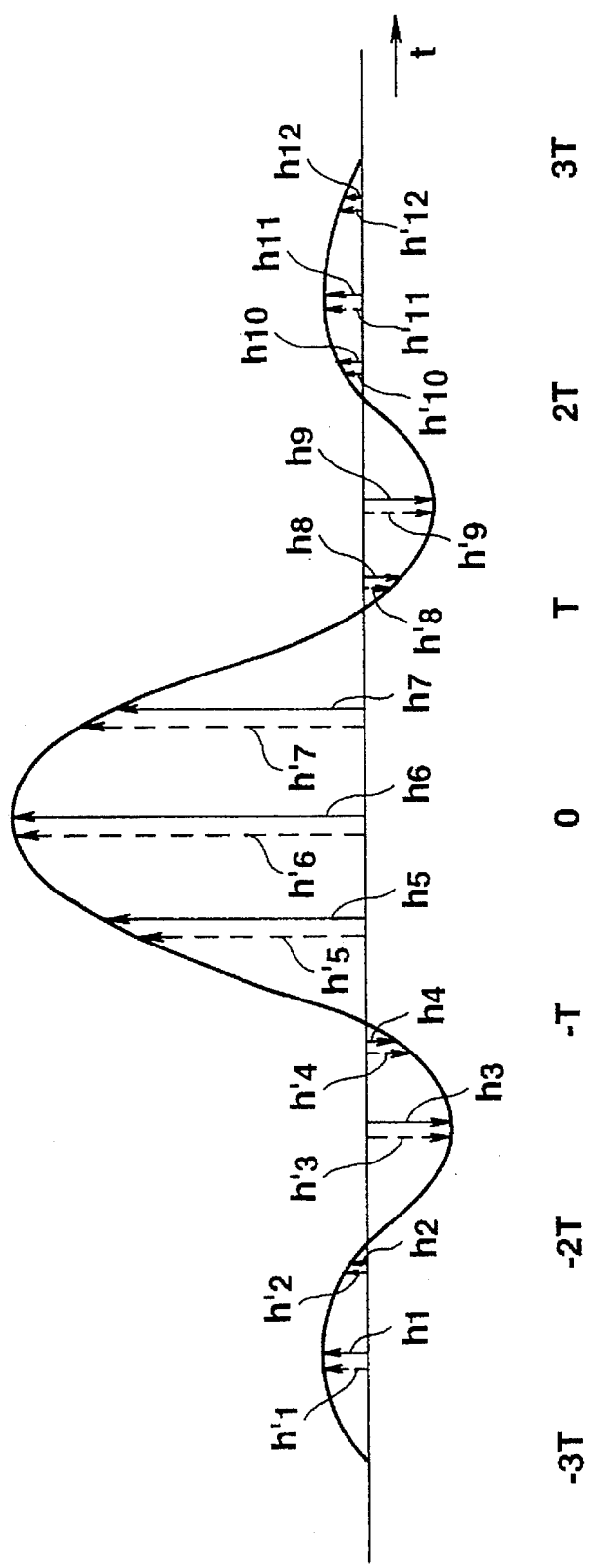
FIG. 2 illustrates the coefficient sets of an RCROF filter in the embodiment of FIG. 1.

Referring to FIG. 2, the coefficients are determined on the waveform of an impulse response of the RCROF filters. In the illustrated example, the coefficients of 6 symbols and 12 taps are used and filtering is performed at a rate two times as fast as a symbol rate.

FIG. 2 shows two sets of coefficients; coefficients h1 to h12 shown in solid lines and coefficients h'1 to h'12 forwardly shifted in terms of time by 1/16 of the symbol rate with respect to the coefficients h1 to h12. The output of a filter having coefficients h'1 to h'12 is time-delayed by 1/16 of the symbol rate for the same input data compared with the output of a filter having coefficients h1 to h12.

This is mathematically expressed as follows.

When a signal $f_1(t)$ is passed through the filter having an impulse response $f_2(t)$, an output signal $f(t)$ of the filter is expressed in the form of convolution of $f_1(t)$ and $f_2(t)$.

$$f(t) = f_1(t) * f_2(t)$$
$$= \int_{-\infty}^{+\infty} f_1(t) f_2(t-x) dx$$

When $f_1(t)$ advances by $t_0$, $f(t)$ becomes as follows.

$$f(t) = f_1(t+t_0) * f_2(t)$$
$$= \int_{-\infty}^{+\infty} f_1(x+t_0) f_2(t-x) dx$$

Putting now $x+t_0=y$ (this is equivalent to the fact that its origin is shifted by $t_0$ in time axis), the result is:

$$= \int_{-\infty}^{+\infty} f_1(y) f_2\{t-(y-t_0)\} dy$$
$$= f_1(t) * f_2(t-t_0)$$

This means that the signal is delayed by $t_0$ on the impulse response waveform.

By utilizing the above fact, the phase of a received signal can be changed for the clock synchronization control check by selecting the coefficient set of the RCROF filters 4-1 and 4-2 according to the phase difference between an input signal and the received signal.

Figure 3:
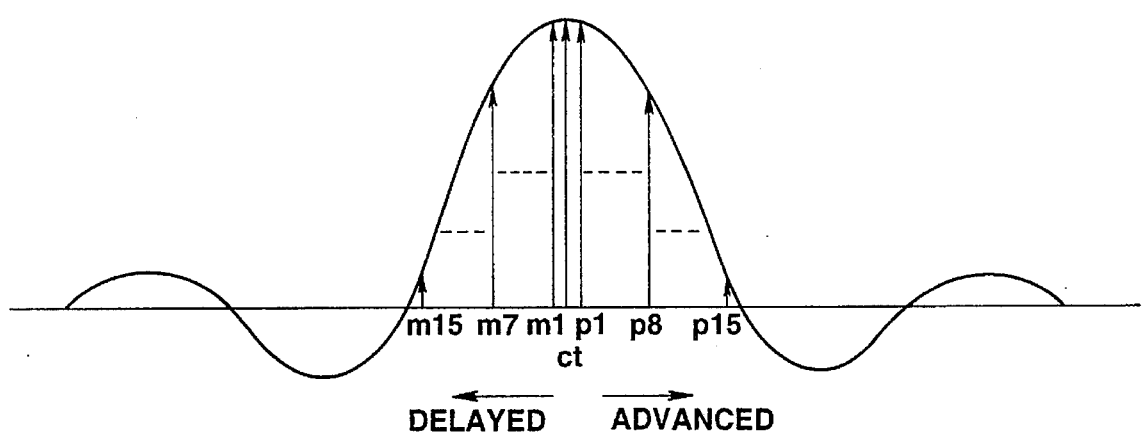
FIG. 3 illustrates various center coefficients of the RCROF filter.

FIG. 3 shows various center coefficients (h6 in FIG. 2) on an impulse response waveform. Assuming that ct is a reference center coefficient of a coefficient set of the RCROF filters 4-1 and 4-2, m1 is the center coefficient of a filter producing an output delaying by 1/16 of the symbol rate from the output of the RCROF filters 4-1 and 4-2, m2 is the center coefficient of a filter producing an output delaying by 2/16 of the symbol rate, p1 is the center coefficient of a filter producing an output leading by 1/16 of the symbol rate, and p8 is the center coefficient of a filter producing an output leading by 8/16 of the symbol rate. Coefficients other than the center coefficient may be determined in the same manner by moving forward or backward on the impulse response waveform according to the position of the center coefficient.

Figure 4:
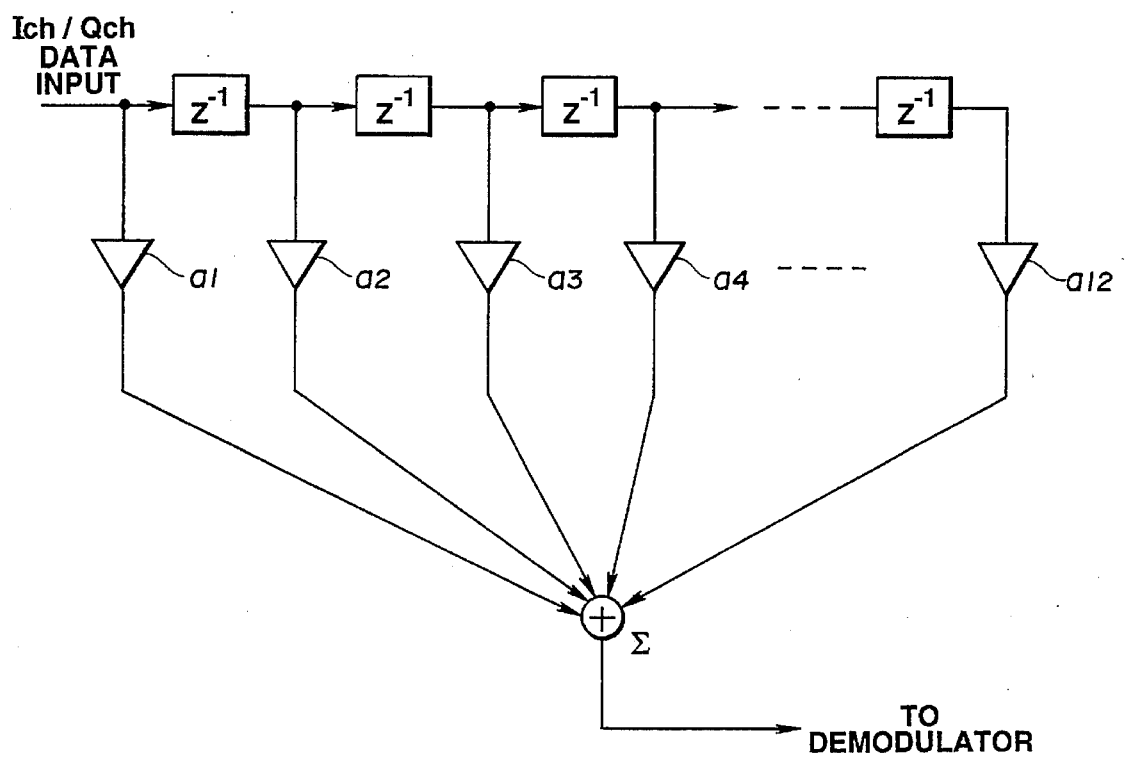
FIG. 4 is a diagram illustrating an example of the RCROF filter.

FIG. 4 illustrates an example of the RCROF filters 4-1 and 4-2 constituted by a non-circulative digital filter which comprises multipliers a1 to a12 for providing a set of the filter coefficients, delay circuits $Z^{-1}$ for producing a delay of 1/2 of the baud rate, and an adder Σ. With such an arrangement, the RCROF filter has coefficients of 6 symbols and 12 taps and performs filtering operation at a rate two times as fast as the symbol rate. The multipliers a1 to a12 may be constructed by a read-only memory (ROM).

Figure 5:
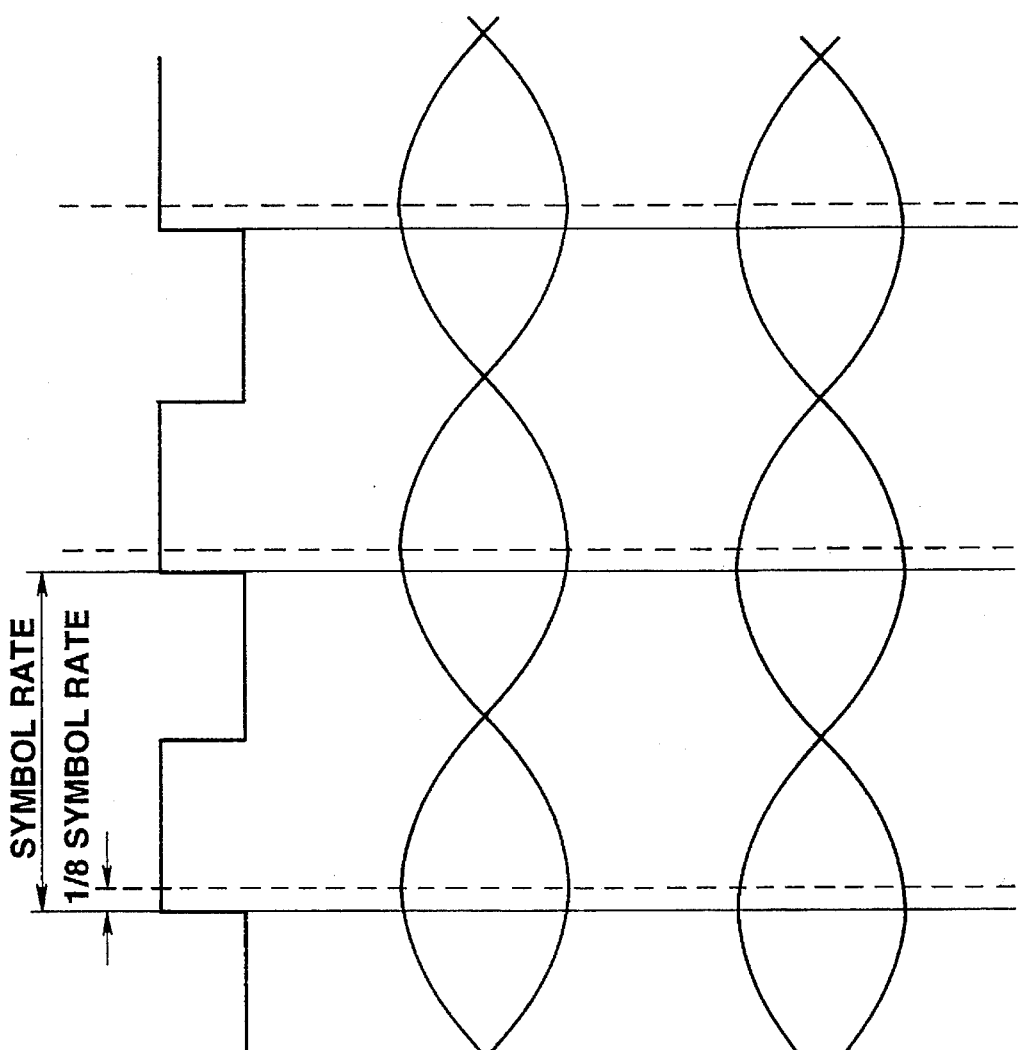
FIGS. 5(a)–5(c) is a diagram illustrating a relationship between the filter coefficients and outputs of a demodulator.

FIGS. 5(a) to 5(c) show the output of the demodulator 5 with respect to a baud rate clock when the demodulator 5 is supplied with the output of the filters 4-1 and 4-2 of two coefficient sets.

FIG. 5(b) shows that the output of the demodulator 5 takes a waveform A when the center coefficient of the RCROF filter is ct. The waveform A becomes a peak at a timing which delays by 1/8 wavelength of a baud rate clock shown in FIG. 5(a) from a rising edge of the baud rate clock. This delayed state is called 1/8 symbol rate shifted state.

When the center coefficient of the RCROF filter coefficient is p2, the output of the demodulator 5 takes a waveform B as shown in FIG. 5(c) for the same input. The waveform B becomes a peak at a timing which coincides with the rising edge of the baud rate clock.

Description will be made as to the procedure for a clock synchronization control check.

Referring back to FIG. 1, a digital input signal supplied from the data generator 13 is separated by the I/Q separator 1 into I and Q channels, which in turn is subjected to a differential encoding at the differential-phase-shift-keying modulator 2 and then passed through the RCROF filters 3-1 and 3-2 for suppressing inter-symbol interference. Having passed through the digital modulator constituted by the I/Q separator 1, the differential-phase-shift-keying modulator 2 and the RCROF filters 3-1 and 3-2, the digital input signal is modulated to be modulated digital data. The modulated digital data is stored in the memory 10.

In order to check the clock extracting circuit 8, data is read out from the memory 10 and inputted to the demodulating section (b).

Figures 6, 7:
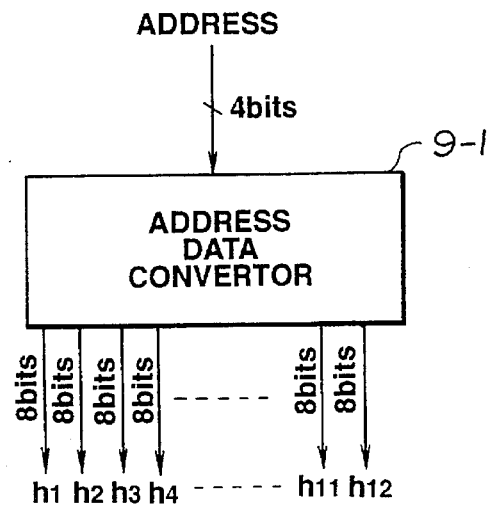
FIG. 6 is a diagram illustrating an example of an RCROF filter coefficient controller in the embodiment of FIG. 1.
FIG. 7 is an example of a table showing correspondence between address of the RCROF filter coefficient controller in FIG. 6 and center coefficient.

Referring to FIG. 6, the RCROF filter coefficient controller 9 comprises an address data converter 9-1 which may be constituted by a read-only memory (ROM). The address data converter 9-1 is arranged to input an address of 4 bits and to output 12 coefficient data h1 to h12 each consisting of 8 bits (96 bits in total). FIG. 7 shows a relation between the address of the memory and the coefficients of the filter. For example, when a 4-bit address "0100" (m4) is inputted, the address data converter 9-1 outputs coefficient data h1 to h12 of 96 bits corresponding to m4.

Assume now that the clock control operator 11 outputs an address "0000" so that the RCROF filter coefficient controller 9, i.e., the address data converter 9-1 outputs the coefficient data corresponding to ct, and the RCROF filters 4-1 and 4-2 perform a filtering operation with the filter coefficient data corresponding to ct so that the demodulator 5 outputs an output of a ⅛ symbol rate shifted state as shown in waveform (A) in FIG. 5(b).

Under such a state, when the clock extracting circuit 8 is operated to extract a clock, the clock control monitor 12 recognizes the phase shift. In response to the recognized phase shift, the clock control operator 11 outputs an address "1110" so that the RCROF filter coefficient controller 9 outputs the coefficient data corresponding to p2. The filter with the coefficient data corresponding to p2 causes the phase to advance by ⅛ of the symbol rate relative to the filter with the coefficient data corresponding to ct. As a result, the demodulator 5 outputs an output with no symbol rate shift as shown by the waveform B in FIG. 5(c).

The clock control monitor 12 monitors the output of the clock extracting circuit 8 to check the operation of the clock control. By setting an address at the clock control operator 11 and by monitoring the clock extracting circuit 8 at the clock control monitor 12, the operation of the clock extracting circuit 8 in connection with the phase shift of the clock can be checked on a software simulation basis without providing additional hardware.

Further, since the signal can be of a digital type throughout all processing stages, it is unnecessary to provide A/D and D/A converters. By merely setting the filter coefficients, a desired phase shift can be produced and the result of the phase shift can be checked. Therefore, precise design and operation check of the clock synchronization control can be easily realized.

Figure 8:
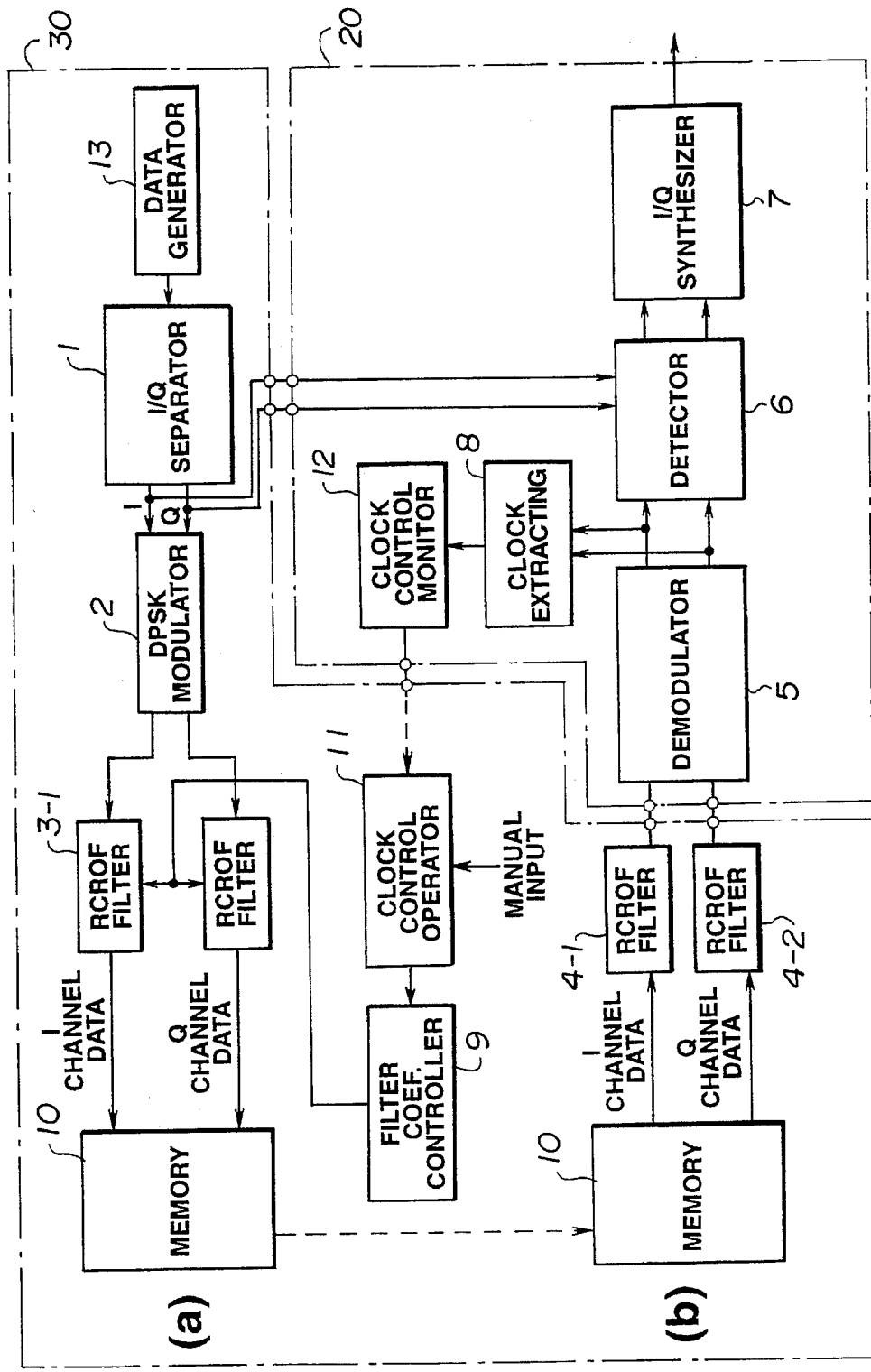
FIG. 8 is a block diagram of a modem of a baseband transmission/reception apparatus comprising a circuit to be checked and a clock synchronization control check system in accordance with another embodiment of the present invention.
Figure 9:
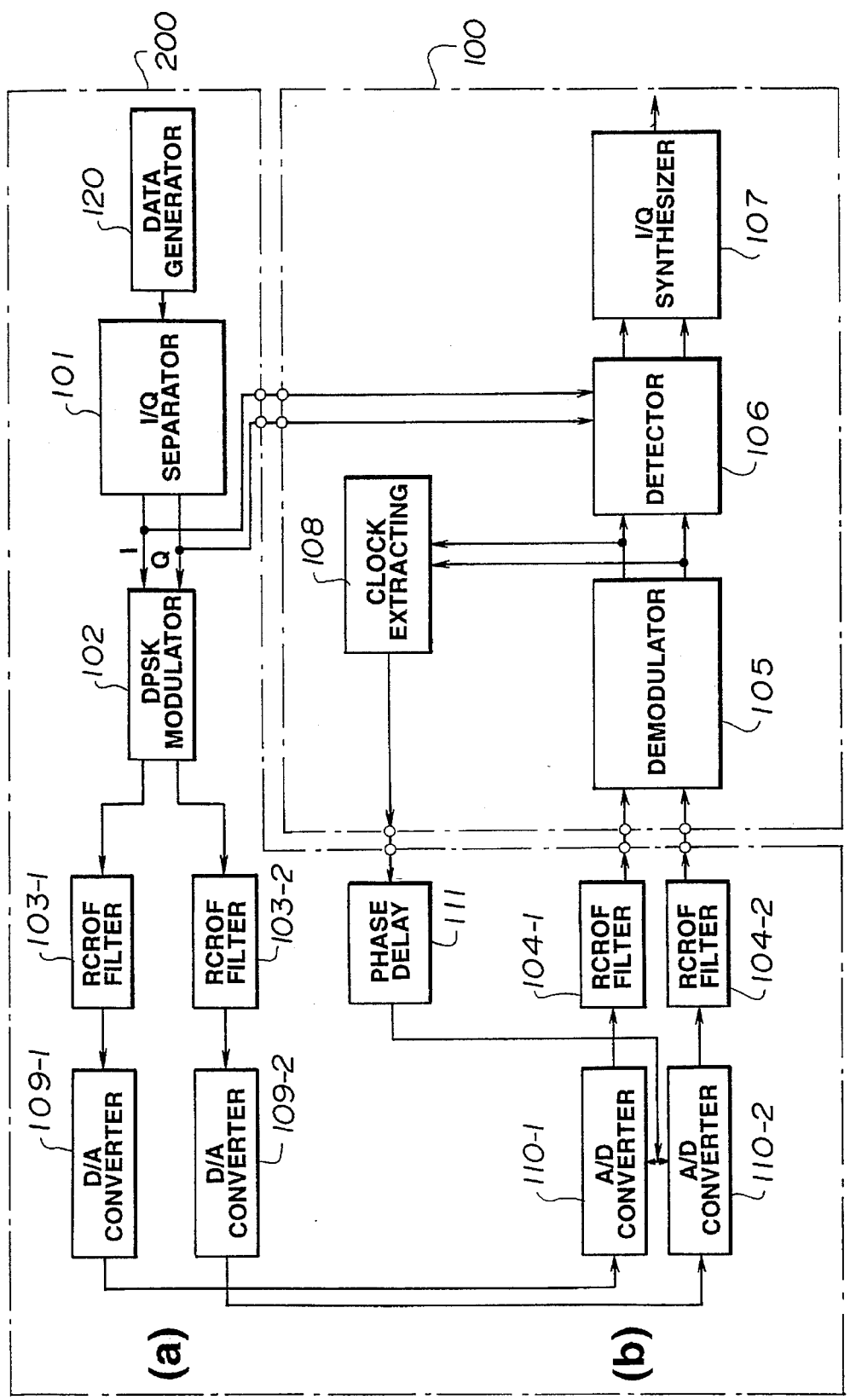
FIG. 9 is a block diagram of a conventional clock synchronization control check system.

The second embodiment is now described referring to FIG. 8, in which (a) is a modulating section and (b) is a demodulating section. The circuit of FIG. 8 is basically the same as in the first embodiment of FIG. 1 and elements and blocks having the same functions as those in FIG. 1 are denoted by the same reference numerals.

The circuit of FIG. 8 is different from that of FIG. 1 in that a control signal of the RCROF filter coefficient controller 9 is supplied not to the RCROF filters 4-1 and 4-2 provided in the demodulating section (b), but to the RCROF filters 3-1 and 3-2 provided in the modulating section (a). Thus, the phase control is performed in the modulating section (a). If the RCROF filters 3-1 and 3-2 in the modulating section (a) are configured to have the same structure as the RCROF filters 4-1 and 4-2 in the demodulating section (b), the clock synchronization check can be carried out in exactly the same procedure as in the case of the first embodiment.

In this embodiment, when data with a phase shift is prepared in the modulating section (a) while the phase shift is determined in the clock control operator 11, the data with phase shift can be stored in the memory 10.

When phase-shifted data and standard non-phase-shifted data or a plurality of data with different amounts of phase shifts are previously stored in the memory 10 so that the data can be selectively read out from the memory 10, the clock synchronization control can be checked only in the demodulating section. On this occasion, it is necessary to change the circuitry of the demodulating section into the circuitry of FIG. 1. Previously storing these data in the memory 10 is advantageous, in particular, in checking a demodulator in mass-produced IC modems since the contents stored in the memory 10 can be copied as many times as desired.

In the foregoing embodiments associated with FIGS. 1 and 8, the reference numeral 20 denotes a circuit to be checked and the reference numeral 30 denotes a clock synchronization control check system. However, the construction of the circuit 20 to be checked and the clock synchronization control check system 30 is not limited to that in these embodiments. When an arbitrary part in the demodulating section of the modem for a baseband transmission/reception apparatus is determined to be a circuit to be checked, a clock synchronization control check system is a remaining part of the modem in which the circuit to be checked thus determined is excluded.

What is claimed is:

1. A clock synchronization control check system for checking a phase error correcting function of a digital signal receiver having demodulation means for demodulating a digital modulated signal and phase error detection means for extracting a synchronization clock signal from a demodulated signal output from the demodulation means and for detecting a phase error of the synchronization clock signal, the system comprising:

data signal generating means for generating a predetermined data signal;

digital modulation means, connected to the data signal generating means, for modulating the predetermined data signal output from the data signal generating means and producing the digital modulated signal;

digital filtering means for filtering the digital modulated signal produced by the digital modulation means in accordance with a set of coefficients given thereto so as to shift a phase of the digital modulated signal;

filtering controlling means for changing the set of coefficients to be given to the digital filtering means from one set to another so as to control the amount of phase shift of the digital modulated signal;

means for supplying an output of the digital filtering means to the demodulation means of the digital signal receiver; and memory means for storing the digital modulated signal produced by the digital modulation means, wherein the digital filtering means filters the digital modulated signal stored in the memory means.

2. A clock synchronization control check system as set forth in claim 1, wherein the digital filtering means comprises a root-cosine-roll-off filter.

3. A clock synchronization control check system as set forth in claim 1, wherein the filtering control means comprises:

filter coefficient storage means for storing a plurality of sets of filter coefficients for controlling the digital filtering means; and filter coefficient selection means for selecting one set of filter coefficients from the plurality of sets of filter coefficients stored in the filter coefficient storage means in response to a command provided from outside thereof and for supplying the selected one set to the digital filtering means.

4. A clock synchronization control check system for checking a phase error correcting function of a digital signal receiver having demodulation means for demodulating a digital modulated signal and phase error detection means for extracting a synchronization clock signal from a demodulated signal output from the demodulation means and for detecting a phase error of the synchronization clock signal, the system comprising:

data signal generating means for generating a data signal;

digital modulation means connected to the data signal generating means for modulating the data signal output from the data signal generating means and producing the digital modulated signal;

first digital filtering means, connected to the digital modulation means, for filtering the digital modulated signal produced by the digital modulation means in accordance with a set of coefficients given thereto so as to shift a phase of the digital modulated signal;

filtering controlling means for changing the set of coefficients to be given to the first digital filtering means from one set to another so as to control the amount of phase shift of the digital modulated signal;

memory means, connected to the first digital filtering means, for storing the digital modulated signal whose phase is shifted by the first digital filtering means;

second digital filtering means for filtering the digital modulated signal stored in the memory means; and means for supplying an output of the second digital filtering means to the demodulation means of the digital signal receiver.

5. A clock synchronization control check system as set forth in claim 4, wherein the filtering controlling means successively selects one set after another from a plurality of sets of filter coefficients, and wherein the memory means stores a plurality of phase-shifted digital modulated signals output by said first digital filtering means and corresponding to the plurality of sets of filter coefficients.

6. A clock synchronization control check system as set forth in claim 4, wherein the first digital filtering means comprises a root-cosine-roll-off filter.

7. A clock synchronization control check system as set forth in claim 4, wherein the second digital filtering means comprises a root-cosine-roll-off filter.

8. A clock synchronization control check system as set forth in claim 4, wherein the filtering control means comprises:

filter coefficient storage means for storing a plurality of sets of filter coefficients for controlling the digital filtering means; and filter coefficient selection means for selecting one set of filter coefficients from the plurality of sets of filter coefficients stored in the filter coefficient storage means in response to a command provided from outside thereof and for supplying the selected one set to the digital filtering means.

* * * * *